Jan. 22, 1963
J. E. SHEWMAKER ETAL
3,074,867
IRRADIATED PETROLEUM RESINS
Filed Dec. 22, 1959
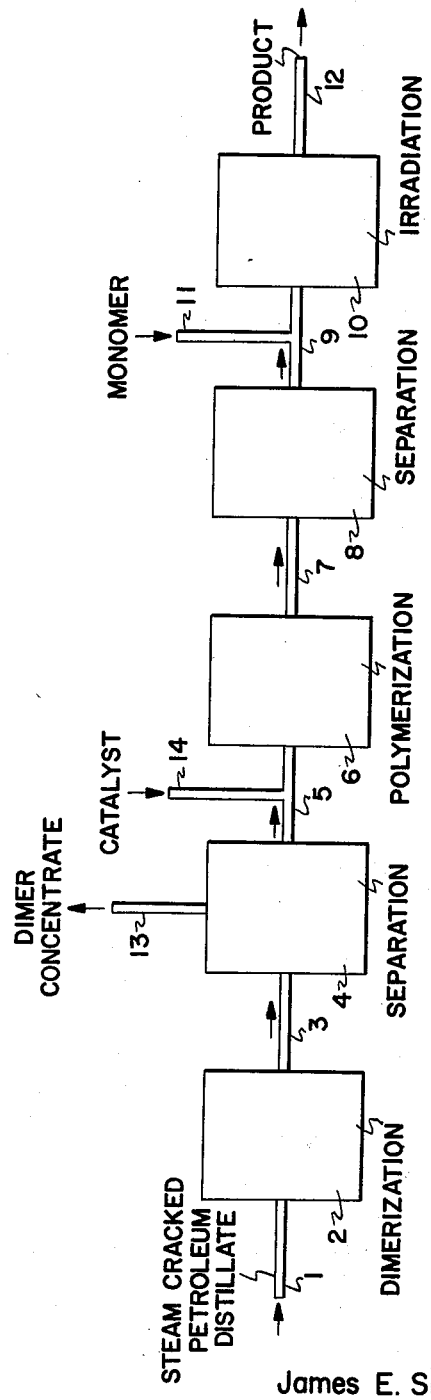
James E. Shewmaker
Joseph F. Nelson   Inventors
By *Small Dunham & Thomas*
*Paul P. Dunham* Attorney

United States Patent Office 3,074,867
Patented Jan. 22, 1963

3,074,867
IRRADIATED PETROLEUM RESINS
James E. Shewmaker, Tulsa, Okla., and Joseph F. Nelson, Westfield, N.J., assignors to Esso Research and Engineering Company, a corporation of Delaware
Filed Dec. 22, 1959, Ser. No. 861,414
8 Claims. (Cl. 204—154)

This invention is concerned with improving the properties of polymeric material produced by the Friedel-Crafts polymerization of light, cracked petroleum fractions. These polymeric materials, e.g. petroleum resins, are improved according to this invention by admixing them with a divinyl aromatic and irradiating the mixture with high intensity ionizing radiation. Resinous solids are thus obtained that have high softening points as compared to the petroleum resins formerly available. Resins can be obtained according to this invention that are normally insoluble in common organic solvents.

This application is a continuation in part of application S.N. 631,812, filed December 31, 1956, and of S.N. 781,454, filed December 19, 1958, both by the present inventors and both now abandoned.

In brief compass, this invention is concerned with improved resins made by admixing a polymeric material formed by the Friedel-Crafts polymerization of a diolefin-olefin mixture boiling in the range of —10° to 300° C., and substantially free of cyclodienes within the range of 2 to 25 wt. percent of a divinyl aromatic, and irradating the admixture with high intenstiy ionizing radiation until at least about 0.5 megaroentgen has been received. In this manner a product having a softening point above 120° C. is obtained.

The Friedel-Crafts polymerization of diolefin-olefin mixtures produces both solid or resinous polymers and liquid polymers of lower molecular weight. In one embodiment of this invention the lower molecular weight liquid material, or fill, can be stripped from the resinous solid. In another embodiment it is advantageous to leave all or a part of this fill in the Friedel-Crafts polymerized material and use this as the raw material for the irradiation step.

In yet another embodiment of this invention a vinyl aromatic compound can be used to enhance the action of the divinyl aromatic compound that is admixed with the Friedel-Crafts polymerized olefin-diolefin mixture before the irradiation step. Also, it has been found to be advantageous to heat the irradiated resinous solid-divinyl aromatic mixture after it has been irradiated to a relatively high temperature because this improves some properties of the product.

The nature of this invention will become clear from the following description of the drawing attached to and forming a part of this specification and from the specific examples.

It has been desired to improve the properties of polymerized unsaturated resins or petroleum resins such as those produced by aluminum halide polymerization of steam-cracked petroleum fractions, from which cyclodienes have been removed. It has now been discovered that such resins can be improved in properties by reacting the resins with a select monomer under select conditions of high intensity ionizing radiation. It appears that the improved properties of the new resin of this invention are not only brought about by the monomer used and the irradiation, but also by the select conditions at which the irradiation is carried out. The reason for this, however, is not clearly understood. The action of the monomer and the irradiation seems to be something in the order of vulcanization.

The new resin of this invention is useful in emulsion paints, rubber compounds, floor tile, form stable structural materials, and the like. It is characterized by having an improved melting point. A slight solubility in organic liquids results at a high degree of cross-linking. The product of this invention usually has a melting point above 120° C., and quite often above 150° C., although melting points as low as 100° C. can be achieved with the product still being considered acceptable.

A specific use of the improved resin of this invention is in impregnating paper board. Paper board containers have not been looked at with too much favor for the transporting of refrigerated goods. When such cartons are removed from the refrigeration chamber, they pick up moisture and tend to disintegrate. The improved resin of this invention overcomes this difficulty while still retaining the properties necessary to form a paper board carton. The paper board product of this invention can be formed by mixing the petroleum resin and the monomer, directly applying it to the paper board, and then irradiating it. This preforming technique can also be used to form a final shape where complicated shapes are to be made from the resin. Alternately the improved resins of this invention, when possessing a melting point of about 100 to 150° C., can be applied as a melt directly to the paper board.

The improved resins of this invention, prepared by irradiating a mixture of solid polymerized resin and low molecular weight liquid polymer, or fill, in the presence of divinyl benzene, are particularly useful as a solid fuel binder for rocket propellants. These improved resins have sufficient tensile strength and elongation to make them particularly suitable for such use. They also have the desirable property of adhering tenaciously to clean or oxidized metal surfaces. Paraffinic diluents, such as white oils, the feed stocks used to prepare white oils, petrolatums, paraffin waxes, and the like, may be used to obtain a more elastic solid fuel binder.

The improved petroleum resins of this invention can be formed from any normally liquid or solid unsaturated polymerized material obtained from the polymerization of a mixture of diolefins and olefins. These unsaturated resins and liquid polymers are prepared by the Friedel-Crafts polymerization of a cracked and unsaturated petroleum fraction substantially free of cyclodienes boiling in the range of —10 to 300° C., and preferably boiling in the range of 10 to 200° C. The cracked and unsaturated petroleum fractions, from which substantially all cyclodienes have been removed, are primarily made up of mixtures of olefins and diolefins.

Examples of unsaturated polymerized resins which are suitable for use as a starting material in the preparation of the improved resins of this invention are described in U.S. Patents 2,734,046, 2,753,325, 2,754,288 and 2,758,988.

A particularly preferred unsaturated polymeric material useful in the preparation of the improved petroleum resins of this invention is prepared by isolating a steam-cracked hydrocarbon petroleum fraction boiling in the range of 20° C. to 140° C., heating the steam-cracked fraction to dimerize substantially all cyclodienes, recovering from the dimerized material an overhead product boiling in the range of 20 to 140° C. that is substantially free of cyclodienes, polymerizing the overhead fraction in the presence of an aluminum halide catalyst at a temperature of —40° C. to 100° C., and recovering the polymerized petroleum resin and the simultaneously produced low molecular weight liquid polymer or fill.

Another particularly preferred polymerized material is prepared by isolating a steam-cracked hydrocarbon petroleum fraction boiling in the range of 15 to 120° C., heating the steam-cracked fraction for about 4 to 10 hours at a temperature of about 90° C. to 140° C. to dimerize the cyclodienes, recovering from the dimerized material an overhead product boiling in the range of 15 to 65° C. that is substantially free of cyclodienes, polymerizing the overhead fraction in the presence of an aluminum halide catalyst at a temperature of about 10 to 100° C., and recovering the polymerized petroleum resin and the simultaneously produced low molecular weight liquid polymer.

By "fill" is meant that normally liquid material produced concurrently with the resinous solid in the Friedel-Crafts polymerization of diolefin-olefin mixtures. This fill boils at least above 200° C., and above 300° C. when the feed to polymerization has a boiling range with an end product of 300° C. The fill can be removed from the solid resin by stripping the Friedel-Crafts reaction products with an inert gas such as nitrogen, e.g. at 3 millimeters of mercury pressure and 270° C. This fill normally comprises 1 to 25 wt. percent based on solid resinous polymer of the material recovered from the Friedel-Crafts polymerization zone. The liquid fill will usually have a cryoscopic molecular weight in the range of 400 to 1000. The fill is a viscous liquid with about 1 to 5 double bonds per molecule. The resinous solid material can be stripped to any desired extent. Normally the polymeric material used will have been stripped to a temperature of at least 250° C. at 3 millimeters of mercury pressure when one desires to use a solid resin substantially free of fill. In many cases, the stripping is done until a temperature of 270° C. is reached at about 3 mm. of Hg.

The monomer or mixture of monomers incorporated into the petroleum resin according to this invention is either a divinyl aromatic compound or a monomer mixture of a divinyl compound and a vinyl aromatic compound. The useful compounds have at least one aromatic nucleus with at least one vinyl group attached to the aromatic ring in resonance with the ring. The vinyl substituent on the aromatic ring can be in the ortho, meta or para position, with respect to other vinyl or alkyl groups if present. The divinyl aromatic compounds will have the general formula $Ar(CH=CH_2)_2$; and the vinyl aromatic compounds used in preparing the monomer mixtures will have the general formula $Ar(CH=CH_2)_2$; wherein Ar of both of the above formulas represents unsubstituted aryl groups such as phenyl, biphenyl, naphthyl, and alkyl-substituted aryl groups substituted with 1 to 3 alkyl groups containing 1 to 20, preferably 1 to 6 carbon atoms per alkyl group. Preferably the compounds used have only one aromatic ring, and have a molecular weight in the range of 93 to 330. Examples of the divinyl aromatic compounds include divinyl benzene, divinyl toluene, divinyl xylene, divinyl naphthalene, etc. An example of the monomer mixture is divinyl benzene and styrene. The amount of monomer or monomer mixture incorporated in the petroleum resin is normally less than 25 wt. percent but greater than 2.0 wt. percent of the final product, the preferred amount being about 3 to 20 wt. percent. In the monomer mixture, 0.5 to 15 moles of the vinyl aromatic compound per mole of the divinyl aromatic compound can be used.

It is surprising that other closely related polyolefinic compounds or common cross-linking agents do not give the same results. From the experimental work so far carried out, an increase in the melting and/or softening point of petroleum resins is dependent to an unpredictable extent on the use of certain select monomers, although the reason for this is not clearly understood at this time.

In the simplest embodiment of this invention, the monomer can be directly admixed with the heated petroleum resin. While the use of solvents is not necessary, they are desirable when the final product after irradiation is to be further processed. The resin can be dissolved in a solvent, and the monomer added thereto. It is preferred that the solvent comprise 70 to 90 wt. percent of the mixture and be relatively inert, i.e. resistant to radiation. Preferred solvents are n-heptane, cyclohexane, benzene and their various homologs; saturated or predominantly aromatic petroleum distillates boiling below 150° C.; or the unpolymerized portion of the feed remaining from the resin preparation and mixtures thereof. Halogenated hydrocarbons, ethers, ketones or other solvents showing little or no reaction in the presence of radiation are also useful.

The high intensity ionizing radiation used in this invention is obtained from controlled terrestrial sources consisting of photons having a wave length less than 50 A., such as gamma and X-rays, rapidly moving charged or uncharged particles of an atomic or subatomic nature having an energy above 30 e.v., such as beta rays, and neutrons, of sufficient intensity such that the dose rate is at least 100 equivalent roentgens per hour. This excludes radiation such as cosmic and ultraviolet which are either too low of an intensity to be of interest, or are not ionizing.

The radiation can be obtained from artificial accelerators, charged particle accelerators such as Van de Graaff generators, X-ray machines, etc.; from nuclear reactors such as atomic piles; from waste from nuclear reactors such as spent fuel elements or portions thereof; and from materials or radioisotopes especially made radioactive in a nuclear reactor, such as cobalt 60. The use of radioisotopes or accelerators is preferred, and it is also preferred that the radiation consist essentially of gamma or beta rays, i.e., be free from neutrons, because of safety and convenience.

It is desirable that the dose rate be above at least 0.1 equivalent megaroentgen per hour, and that the minimum dose received by the product be at least ½ equivalent megaroentgen for all types of radiation. The maximum dose received should be limited and is preferably under 150 megaroentgens. Within limits, depending upon the polymer being treated, larger radiation dosages may be used with smaller amounts of monomer present. The resin-monomer mixture can be exposed to the radiation source in any convenient manner. If a radioisotope is used, it can be placed near the radioisotope in a batch-wise manner, or simply flowed in, through, or around the isotope in suitable conduits. Preformed articles can be exposed continuously on a conveyor passing through a high flux radiation field.

Referring to the accompanying drawing, the steam-cracked petroleum distillate is admitted to the process by line 1. This steam-cracked material can be obtained from a kerosene, gas-oil, naphtha, or the like, that has been cracked in the presence of steam at a temperature of about 1000° F. to 1500° F. to give a highly unsaturated product. Alternately the unsaturated distillate can be made by coking, with a minimum amount of steam, petroleum, petroleum fractions or petroleum residues at temperatures of 1000° to 1600° F., or by "checker-work" cracking of petroleum or fractions thereof. In one embodiment of this invention the unsaturated distillate preferably boils predominantly in the range of 20° C. to 140° C.

The cracked materials are admitted to a dimerization stage 2, wherein the cyclopentadienes are converted substantially completely to dimers by being thermally soaked, at a temperature of about 90° C. to 140° C. for a time in the range of about 1 to 10 hours. The heat-treated material is passed from zone 2 to zone 4 by line 3. It is separated in zone 4 to remove the dimer concentrate via line 13 and to leave a fraction boiling in the range of about 20° to 140° C. that is predominantly composed of $C_5$–$C_8$'s. This separation can be done by distillation. This material, substantially free of cyclodienes, is transferred by line 5 to polymerization zone 6. Catalyst from line 14 is added to the material. The catalyst is preferably an aluminum halide catalyst, e.g., aluminum chloride. After addition of the catalyst, the material is subjected to polymerization, preferably at approximately room temperature or slightly above, under conditions of good agitation.

The polymerized material is transferred from zone 6 by line 7 to a separation zone 8. The polymerized resin is purified therein by water and/or alkali washing to remove catalyst, and by stripping, as with steam, to remove unpolymerized material. An alternate way of removing the halide catalyst is to add methyl alcohol to form a solid complex, which is then filtered off. As indicated previously, the stripping of the polymer can be controlled to remove a part or all of the liquid fill. The finished petroleum resin is removed by line 9.

The purified petroleum resins stripped of fill are usually amber colored products, having a softening point in the range of 70° to 105° C., and usually represent 15 to 40 wt. percent yield on the cracked petroleum distillate feed supplied by line 1.

When the fill is left in the Friedel-Crafts polymerized material the material may range from a viscose liquid at room temperature to a soft solid having a softening point from about 20° C. up to about 70° C.

The preferred steam-cracked distillate feed to the resin polymerization step has the following composition (as wt. percent):

| | |
|---|---|
| Benzene | 15–30 |
| Toluene | 3–10 |
| $C_8$ aromatics | Less than 1 |
| Diolefins | 11–25 |
| Olefins | 70–29 |
| Paraffins | 0–5 |

The purified petroleum resin is passed by line 9 to radiation zone 10. A di-vinyl aromatic compound or the mixture thereof with a vinyl aromatic is added to the purified resin by line 11. As indicated above, a solvent may also be added to the mixture. The mixture of resin and monomer is exposed to radiation at a dose rate preferably of at least 0.1 equivalent megaroentgen per hour until the mixture has received a dose of at least ½ equivalent megaroentgen. Relatively low pressures (below 100 p.s.i.) or atmospheric pressure can be used during irradiation, and the temperature is preferably maintained in the range of $-10°$ to $+150°$ C.

The irradiated product is removed from zone 10 by line 12 and usually needs no further treatment, although it can be further purified if desired, e.g., by steam-stripping to remove solvent and/or unreacted monomer.

The petroleum resin stripped of fill before the irradiation treatment is somewhat unsaturated, having an iodine number (Wijs) in the range of 50 to 180, usually has a melting point in the range of 50° to 110° C., and is usually soluble in aromatic solvents. After irradiation it may or may not be soluble, depending on the amount of monomer added and the extent of irradiation. Insolubility, when it occurs, indicates that cross-linking is occurring. The irradiated product usually has a softening point above 100° C. and the preferred product made from the above described petroleum resin has a softening point above 120° C. The softening point of the product resin depends on the use to which it is put. When soluble resins are desired, as for example in paints, low melting points in the range of about 100° to 160° C. are desired. When form-stable resins are desired, there is no upper limit on the softening point. When the fill is left in the resin, the irradiated product still has a high melting point usually above 150° C. but it is more soluble in common organic solvents. When heated to a temperature in the range of 100° to 300° C., the fill containing irradiated material can be converted into a heavy more brittle resin.

EXAMPLES

Example 1

The petroleum resin used in this example is commercially available and was obtained by steam-cracking at a temperature of 1300° C. a gas-oil distillate having a boiling point in the range of 200° to 400° C. in the presence of about 80 mole percent steam. A fraction boiling in the range of 20° to 135° C. was isolated from the steam-cracked mixture and heat treated for 6 hours at a temperature of 125° C. to dimerize the cyclopentadienes. From the heat treated material, a fraction boiling in the range of 20° to 130° C. was recovered, which was composed principally of $C_5$–$C_8$ hydrocarbons and had the following inspections:

| | Wt. percent |
|---|---|
| Benzene | 18 |
| Toluene | 7 |
| $C_8$ aromatics | <1 |
| Diolefins | 15 |
| Olefins | 59 |
| Paraffins | 1 |

This $C_5$–$C_8$ fraction was polymerized by the addition of about 1 wt. percent of an aluminum chloride catalyst in finely divided form, at a temperature of about 30° C. The catalyst was removed from the material so polymerized by water washing and filtration, and the material was separated by distillation and stripped of liquid fill to recover a solid petroleum resin having a softening point of 103° C., an iodine number of 80, and amounting to 35 wt. percent on the steam-cracked distillate feed. This material is called petroleum resin A hereinafter.

About 6 grams of this petroleum resin A were carefully melted on a hot plate, and then about one gram of a commercial divinyl benzene solution (50% concentration in diethyl benzene) was quickly stirred in as the resin cooled. This sample was irradiated using a cobalt 60 source, having a rating of about 2700 curies. It was exposed to the source such that the dose rate was approximatey 335,000 roentgens per hour. It was irradiated for 87 hours at a temperature of 25° C., while contained in an ordinary glass bottle. The resulting product did not melt completely at 220° C., or below. It was largely insoluble in n-heptane.

Example 2

About 6 grams of petroleum resin A were dissolved in 6.9 grams of heptane and one gram of divinyl benzene solution, as above, was added with shaking. This mixture was exposed to the above irradiation source in a glass container, at a dose rate of 335,000 roentgens per hour for 87 hours and a temperature of 25° C. After irradiation, the entire sample existed as a soft solid, somewhat resembling a firm grease. The material was insoluble in heptane, indicating cross-linking had occurred.

Example 3

Petroleum resin A was blended with the commercial divinyl benzene solution in the same manner as described in Example 1. Before the mixture had solidified, it was poured into a ring used for the ring-and-ball softening point determination of resins. The mixture in the ring was irradiated in the above-described cobalt 60 source for 64 hours at a dose rate of 350,000 roentgens per hour, until a total dose of 23 megaroentgens had been received. When subjected to a ring-and-ball softening point determination, this sample did not soften at 165° C., at which point the glycerine heating bath began to darken. The original petroleum resin had a ring-and-ball softening point of 103° C.

Example 4

Eighteen grams of petroleum resin A were melted carefuly and one gram of the 50% commercially available divinyl benzene solution was poured into it with stirring. As in Example 3, this sample was poured into a softening point ring and irradiated with gamma rays in the manner before described. After 23 megaroentgens of irradiation, the ring-and-ball softening point was 108° C. An identical sample irradiated to the extent of 40 megaroentgens possessed a ring-and-ball softening point of 111° C.

Example 5

Eight grams of petroleum resin B which was similar to that described in Example 1, but with an initial ring-and-ball softening point of only 70° C., were melted and thoroughly mixed with 0.9 gram of the 50% divinyl benzene solution. This sample was irradiated in a softening-point ring as in Example 3 to a total dosage of 14 megaroentgens. Its softening point was above 163° C.

Example 6

Eight grams of petroleum resin B were blended with 0.16 gram of the 50% divinyl benzene solution and irradiated in the manner of Example 5. After 14 megaroentgens, the softening point was 80° C. Another portion of this blend exhibited a softening point of 87° C. after absorbing 49 megaroentgens of gamma radiation.

Example 7

The petroleum resin and low molecular weight liquid polymer (fill) used in this example were obtained by steam cracking at a temperature of 1400° F., a gas oil distillate having a boiling point in the range of 220 to 350° C. in the presence of about 80 mole percent steam per mole of feed. A fraction boiling in the range of 15 to 120° C. was isolated from the steam-cracked mixture and heated for 6 hours at a temperature of 125° C. to dimerize the cyclopentadienes. From the heat treated material, a fraction boiling in the range of 15 to 65° C. was recovered. This fraction, containing principally $C_5$ hydrocarbons, had the following composition:

|  | Weight percent |
|---|---|
| Olefins | 59.6 |
| Diolefins | 17.7 |
| Paraffins and $C_6+$ fractions | 22.8 |

The above predominantly $C_5$ fraction was polymerized by the addition of about 1 wt. percent of an aluminum chloride catalyst in finely divided form at a temperature of about 30° C. The catalyst was removed from the material so polymerized by water washing and filtration and the unreacted components separated by distillation. The yield of solid resin amounted to about 40 wt. percent whereas that of fill amounted to about 8 wt. percent of the steam cracked distillate feed. This mixture of solid resin and fill had an ASTM ring-and-ball softening point of 40° C. and is hereinafter referred to as material C.

The liquid polymer (fill) produced above has the following characteristics:

Color: light amber (10–12 on Gardner scale)
Boiling point: 200° C to 500° C.
Viscosity: 17 poises
Iodine No.: 160
Aniline point: 170° F.
Specific gravity: 0.88–0.93

A sample of material C cast in a ring-and-ball softening point ring was irradiated, using a cobalt 60 source having a rating of about 2700 curies. It was exposed to the source such that the dose rate was approximately 335,000 roentgens per hour. The sample received 23 megaroentgens of gamma radiation over a period of 63 hours at a temperature of about 25° C. The ASTM ring-and-ball softening point following the irradiation was 78° C.

Example 8

Two samples of material C were melted on a hot plate and mixed by stirring with 3 and 5 wt. percent, respectively, of the commercial divinyl benzene mixture. These samples were then cast into softening point rings and irradiated. After absorbing 29 megaroentgens of gamma radiation under the same conditions as in Example 7, both of the samples exhibited ASTM ring-and-ball softening points above 161° C.

Example 9

Material C was stripped of fill at 270° C. and 3 mm. of mercury pressure to yield an amber petroleum resin having an ASTM ring-and-ball softening point of 70° C. and an iodine number of 80, hereinafter called petroleum resin D. Two separate samples of petroleum resin D were then melted on a hot plate, mixed with 2 and 3 wt. percent, respectively, of divinyl benzene and subjected to 29 megaroentgens of gamma radiation under the same conditions as were used in Example 7. The ASTM ring-and-ball softening points obtained for these two irradiated samples were 101° C. and 129° C., respectively. From a comparison of Examples 7 and 8 it is clear that the presence of the fill materially accelerated the radiation curing rate of the petroleum resin.

Example 10

Petroleum resin D was melted and mixed with 5.6 wt. percent of divinyl benzene. After absorbing 14 megaroentgens of gamma radiation, this material had an ASTM ring-and-ball softening point of above 160° C.

Example 11

Samples of petroleum resin D were irradiated according to the procedure of Example 7. The total radiation dosage and the amount of divinyl benzene (DVB) added to the solid resin were varied with each sample. The data and the results obtained are summarized in the following table.

TABLE I

| DVB, Wt. Percent of Resin | After 6.6 Megaroentgens | | | After 26 Megaroentgens | | |
|---|---|---|---|---|---|---|
| | S.P., °C.[1] | Solubility in— | | S.P., °C.[1] | Solubility in— | |
| | | Heptane | Toluene | | Heptane | Toluene |
| 0 | 74 | Soluble | Soluble | 75 | Soluble | Soluble. |
| 0.5 | 77 | do | do | 79 | do | Do. |
| 1.0 | 77 | do | do | 79 | do | Do. |
| 2.0 | 80 | do | do | 82 | do | Do. |
| 3.0 | 78 | do | do | 80 | do | Do. |
| 5.0 | 95 | Partially Soluble. | Partially Soluble. | 85 | do | Do. |
| 6.0 | >140 | Insol | Insol | >140 | Insol | Insol. |
| 7.0 | >140 | Insol | Insol | >140 | Insol | Insol. |
| 8.0 | >140 | Insol | Insol | >140 | Insol | Insol. |

[1] ASTM ring-and-ball procedure.

Example 12

Material C was partially stripped of the liquid polymer. Approximately 15 wt. percent of low molecular weight liquid polymer (fill) was left in the sample. This mixture is hereinafter called material E. This partially stripped mixture of resin and liquid polymer, mixture E, had a softening point of 40° C. The following Table II is a summary of the experiments performed on material E and shows in comparison to Example 11 that less divinyl benzene is required to give a high softening point to these partially stripped resin mixtures than is required for imparting high softening points to the solid resins fully stripped of liquid polymer (fill). The irradiations were conducted according to the procedure of Example 7.

TABLE II

| DVB, Wt. Percent on Resin | After 5 Megaroentgens | | | After 27 Megaroentgens | | |
|---|---|---|---|---|---|---|
| | S.P., °C.[1] | Solubility in— | | S.P., °C.[1] | Solubility in— | |
| | | Heptane | Toluene | | Heptane | Toluene |
| 0 | 42 | Soluble | Soluble | | Soluble | Soluble. |
| 0.5 | 44 | do | do | | do | Do. |
| 1.0 | 46 | do | do | | do | Do. |
| 2.0 | 49 | Partially Soluble. | Partially Soluble. | 54 | Partially Soluble. | Partially Soluble. |
| 3.0 | >145 | Insol | Insol | >140 | Insol | Insol. |
| 5.0 | >145 | Insol | Insol | >140 | Insol | Insol. |

[1] ASTM ring-and-ball procedure.

A comparison of the softening points of the irradiated resin-polymer mixtures and partially stripped mixtures of Examples 7, 8 and 12 with the stripped irradiated resins of Examples 9, 10, and 11, show that only 3 wt. percent of divinyl benzene need be added to the less expensive resin-liquid polymer mixtures, while between 5 and 6 wt. percent of divinyl benzene is required with the stripped resins to form the preferred high softening point resins.

The resins obtained by irradiating the divinyl benzene treated mixtures of resin and liquid polymer tend in some cases to be gummy at room temperature while exhibiting a high softening point due to resistance to flow at higher temperatures. The following examples show the conversion of a gummy material of this type to a hard brittle resin at room temperature by heat treating at temperatures in the range of 100° C. to 300° C. for a period of time in the range of 2 minutes to 3 hours, preferably at temperatures of about 150° C. to 250° C. for a period of time in the range of 10 minutes to 2 hours, the time depending upon the degree of hardness desired.

*Example 13*

A blend of 16.7 g. of material E and 1.0 g. of a 50 wt. percent divinyl benzene solution were irradiated according to the procedure of Example 7 until 5 megaroentgens of cobalt 60 gamma rays had been absorbed. A resin which was gummy and taffy-like at room temperature but which resisted flow at high temperatures was formed. While this resin sample sagged badly during the softening point determination, it did not release the steel ball at temperatures up to 150° C. This irradiated resin was practically totally insoluble in benzene.

A small amount of this irradiated sample was heated on a spatula above a Bunsen burner for 2 to 3 minutes. It melted, but when it was allowed to cool to room temperature, it hardened to a brittle resin having a good color.

*Example 14*

A portion of the irradiated resin plus fill of Example 7 was heated at 177° C. for 20 minutes. The resulting material was a cloudy tan hard resin at room temperature which still showed a ring-and-ball softening point above 150° C. and which sagged much less during the softening point determination. This heat-treated irradiated resin also appeared to be largely soluble in benzene following the heat treatment.

The following examples show that if a mixture of divinyl benzene and styrene is substituted for a divinyl benzene prior to irradiating the solid unsaturated resins stripped of fill, a more soluble resin with a higher softening point will result. Resins irradiated with styrene alone have shown practically no increase in softening point over a wide range of radiation absorption. However, irradiation with both styrene and divinyl benzene has led to resins softening above 150° C. and which are still soluble in such organic solvents as benzene. This is desirable from an economic standpoint, since styrene is less expensive than divinyl benzene.

*Example 15*

Petroleum resin A was mixed with various amounts of styrene and divinyl benzene and irradiated.

| Runs | a | b | c | d | e | f |
|---|---|---|---|---|---|---|
| Additives, Wt. percent on Resin: | | | | | | |
| Divinyl benzene | 4.0 | 6.0 | 8.0 | 1.0 | 2.5 | 5.0 |
| Styrene | | | | 10 | 10 | 10 |
| Radiation, Megaroentgen | 29 | 29 | 23 | 16 | 16 | 16 |
| Softening Point, °C [1] | 112 | 126 | >160 | 107 | 110 | >150 |
| Solubility in Benzene | Sol. | Sol. | Insol. | Sol. | Sol. | Sol. |

[1] By ASTM ring-and-ball method.

The divinyl benzene used in the above experiments was a commercial sample containing about 50 wt. percent active ingredient with diethyl benzene as the principal impurity. It was used as received. The styrene was distilled a few days before use. The blends were made by melting solid resin and stirring in the liquids as it cooled. The blends were poured into the rings used for softening point determination and irradiated in a nitrogen atmosphere according to the procedure of Example 7.

Runs a, b, and c show that between 6 and 8 wt. percent of divinyl benzene, and between 23 and 29 megaroentgens of absorbed radiation are required to give a softening point above 150° C. However, in run f only 5 weight percent of divinyl benzene, when combined with 10 wt. percent styrene, increased the softening point of the resin to above 150° C. Also, the product of run f, while softening at a high temperature, remained soluble in benzene, whereas other products softening near 150° C. were insoluble in benzene. Five-tenths to 15 moles of styrene may be used per mole of divinyl benzene as well as for their homologs.

*Example 16*

4 wt. percent of divinyl benzene of 98 percent purity is added to 96 wt. percent of material C and irradiated to give a high softening point resin.

COMPARATIVE EXAMPLES

*Example 17*

Petroleum resin A was irradiated in the absence of monomer under the same conditions as described in Example 1. It was found that irradiating the resin without the monomer only slowly raised the softening point. After 29 megaroentgens, the softening point was only 105° C.

*Example 18*

Six grams of petroleum resin prepared in the same manner as resin A were blended with one gram of diallyl maleate and exposed in the manner described in Example 1 to 21 megaroentgens, following which the melting point (Nalge) was 97° C. The Nalge melting point of the original resin was 113° C.

*Example 19*

Petroleum resin A was blended with 3, 14 and 25 wt. percent of distilled styrene and irradiated as in Example 1. After 53 megaroentgens of gamma radiation, the melting points were 101, 110 and 106° C., respectively.

*Example 20*

Example 19 was repeated using in place of styrene 16 wt. percent of vinyl cyclohexene, diallyl phthalate, tetramethylene diacrylate, vinyl acrylate, and di-vinyl ether of diethylene glycol. All five of these samples received 13 megaroentgens of gamma radiation under the same conditions as Example 1. The Nalge melting points were as follows.

Vinyl cyclohexene _____ Liquid product
Diallyl phthalate _____ °C__ 60
Tetramethylene diacrylate _____ °C__ 100
Vinyl acrylate _____ °C__ 100
Di-vinyl ether of diethylene glycol_____ °C__ 70

*Example 21*

Material C was irradiated without the addition of divinyl benzene until a total of about 75 megaroentgens had been absorbed. The ASTM ring-and-ball softening point of this irradiated product was 84° C.

*Example 22*

Petroleum resin A was melted and blended with various concentrations of styrene alone and then irradiated according to the procedure of Example 7. The results are presented in the following table.

| Wt. percent Styrene based on Resin | Radiation Megaroentgen | Melting Point, °C., (Nalge) |
|---|---|---|
| 0 | 0 | 113 |
| 0 | 29 | 123 |
| 3 | 17 | 99 |
| 14 | 17 | 91 |
| 25 | 17 | 90 |
| 3 | 53 | 101 |
| 14 | 53 | 110 |
| 25 | 53 | 106 |

This table shows that addition of styrene by itself has only a slight effect on the melting point of the resin. This slight effect causes a decrease rather than an increase in the melting point of the resin. This table, when compared to Example 15, establishes the synergistic effect of the combination of styrene and divinyl benzene when added to the resin and irradiated.

Having described this invention, what is sought to be protected by Letters Patent is succinctly set forth in the following claims.

What is claimed is:

1. A method for producing an improved resin which comprises isolating a steam-cracked hydrocarbon petroleum fraction boiling in the range of 20° C. and 140° C., heat-soaking the steam-cracked fraction at 90° to 140° C. sufficient to dimerize substantially all cyclodienes, separating the resulting admixture and recovering an overhead product boiling in the range of 20° C. and 140° C., polymerizing the material so separated in the presence of an aluminum halide catalyst at a temperature of about −40° C. to +100° C., recovering a resin from the material so polymerized having a melting point in the range of 50° to 110° C. and an iodine unsaturation (Wijs) in the range of 50 to 180, adding thereto 0.5 to 25 wt. percent based on final product of a divinyl aromatic, exposing said resin to high energy ionizing radiation at a dose rate of at least 0.1 equivalent megaroentgen per hour until at least ½ equivalent megaroentgen of irradiation have been absorbed, and recovering a resin having a melting point above 100° C. that is substantially insoluble in aromatic solvents.

2. The method of claim 1 wherein the mixture of organic compound and resin is exposed to irradiation while carried in a solvent, said solvent comprising 10 to 90 wt. percent of the mixture and wherein said high intensity radiation consists essentially of gamma rays.

3. An improved resin made by reacting a minor amount of a di-vinyl aromatic compound with a polymerized unsaturated resin under the influence of high energy ionizing radiation having an energy above 30 e.v., at a temperature in the range of −10 to 150° C., and a dose rate of at least 0.1 equivalent megaroentgen per hour, until a total dose of at least ½ megaroentgen has been received, said resin being obtained by isolating a steam-cracked hydrocarbon petroleum fraction boiling in the range of 20° C. and 140° C., heat-soaking the fraction to dimerize substantially all cyclodienes, separating the resulting mixture to recover an overhead product boiling in the range of about 20° C. and 140° C. and substantially free of cyclodienes, and polymerizing the material so recovered in the presence of an aluminum halide catalyst at a temperature of about −40° C. to +100° C. and recovering the petroleum unsaturated resin formed thereby.

4. The resin of claim 3 wherein the material recovered from the dimerization step has the following composition (as wt. percent):

| | |
|---|---|
| Benzene | 15–30 |
| Toluene | 3–10 |
| $C_8$ aromatics | Less than 1 |
| Diolefins | 11–25 |
| Olefins | 70–29 |
| Paraffins | 0–5 |

5. An improved resin made by admixing about 1 part by weight of a 50% solution of di-vinyl benzene in di-ethyl-benzene with 6 parts by weight of a petroleum resin obtained by the aluminum chloride polymerization of a steam-cracked gas oil fraction boiling in the range of 20 to 130° C., said resin having an iodine number of about 80 and a softening point of about 103° C., exposing the resulting admixture to gamma radiation obtained from cobalt 60 at a rate of about 335,000 roentgens per hour and at a temperature of about 25° C., and recovering an improved resin having a melting point of about 200° C.

6. The resin of claim 5 wherein the irradiated product has a melting point of about 120° C.

7. A process comprising admixing 2 to 25 wt. percent of a divinyl aromatic compound with a polymeric material obtained by isolating the steam cracked hydrocarbon petroleum fraction boiling in the range of 20 to 140° C., heat soaking the fraction to dimerize substantially all cyclodienes, separating the resulting mixture to recover the overhead product boiling in the range of about 20° C. to 140° C., substantially free of cyclodienes, polymerizing the material so recovered in the presence of an aluminum halide catalyst at a temperature of about −40° to +100° C. and stripping the liquid polymer at 270° C. and 3 mm. of mercury pressure, irradiating the admixture of polymeric material and divinyl aromatic compound with high intensity ionizing radiation at a dose rate of at least 0.1 equivalent megaroentgen per hour until a total dose of at least 0.5 megaroentgen has been absorbed, and recovering a product having a softening point above 100° C.

8. The process of claim 7 wherein said product is further treated after irradiation by being heated to a temperature above 100° C.

References Cited in the file of this patent

UNITED STATES PATENTS

| 2,728,742 | Banes et al. | Dec. 27, 1955 |
| 2,836,553 | Guthrie et al. | May 27, 1958 |

OTHER REFERENCES

Ballatine et al.: Brookhaven National Laboratory Report, No. 414, pages 1–5, October 1956.